United States Patent
Sobti et al.

(10) Patent No.: US 8,107,614 B2
(45) Date of Patent: Jan. 31, 2012

(54) ENHANCED COLORFUL RING-BACK TONE BY MIXING CONTENT STREAMS IN REAL TIME

(75) Inventors: Arun Sobti, Milpitas, CA (US); Shital Mehta, Karnataka (IN); Rohit Sonalkar, Sunnyvale, CA (US)

(73) Assignee: Movius Interactive Corporation, Johns Creek, GA (US)

( * ) Notice: Subject to any disclaimer, the term of this patent is extended or adjusted under 35 U.S.C. 154(b) by 1256 days.

(21) Appl. No.: 11/584,012

(22) Filed: Oct. 20, 2006

(65) Prior Publication Data

US 2007/0294425 A1    Dec. 20, 2007

(51) Int. Cl.
*H04M 3/00* (2006.01)
(52) U.S. Cl. ............. 379/373.02; 379/375.01; 379/418; 455/567
(58) Field of Classification Search ..... 379/372–376.02, 379/418
See application file for complete search history.

(56) References Cited

U.S. PATENT DOCUMENTS

| | | | |
|---|---|---|---|
| 2002/0110224 A1* | 8/2002 | Kovales et al. | 379/67.1 |
| 2005/0117726 A1* | 6/2005 | DeMent et al. | 379/142.01 |
| 2006/0094474 A1* | 5/2006 | Zatloukal et al. | 455/572 |
| 2008/0063168 A1* | 3/2008 | Haley et al. | 379/201.01 |
| 2009/0143054 A1* | 6/2009 | Drescher et al. | 455/418 |

OTHER PUBLICATIONS

Newton, Henry. Newton's Telecom Dictionary, 23rd Edition. New York, 2007.*

* cited by examiner

*Primary Examiner* — Fan Tsang
*Assistant Examiner* — Ibraham Sharifzada
(74) *Attorney, Agent, or Firm* — Smith Risley Tempel Santos LLC; Gregory Scott Smith

(57) ABSTRACT

Methods and systems for enhanced Colorful Ring-Back Tone (eCRBT) services by mixing multiple digital content streams in real time are provided, including audio, video, data, text-based message, and hypermedia object streams. One or more properties of the content streams, such as volume or pitch of an audio stream, or brightness and layout of a video stream, are gradually altered such that a prominence of the an individual content stream is dynamically and seamlessly changed relative to other content streams with time. An eCRBT controller controls mixing and playing of digital content either based on an internal algorithm in an application server, or selections received from subscribers through provisioning interfaces. Personalized content streams can be mixed and played in real time based on interactive response received from a calling subscriber. Content may also be personalized based on caller by service provider. Subscriber-chosen content, subscriber's current availability information, and promotional or informational content from a service provider or a third party may be mixed seamlessly on top of each other.

22 Claims, 9 Drawing Sheets

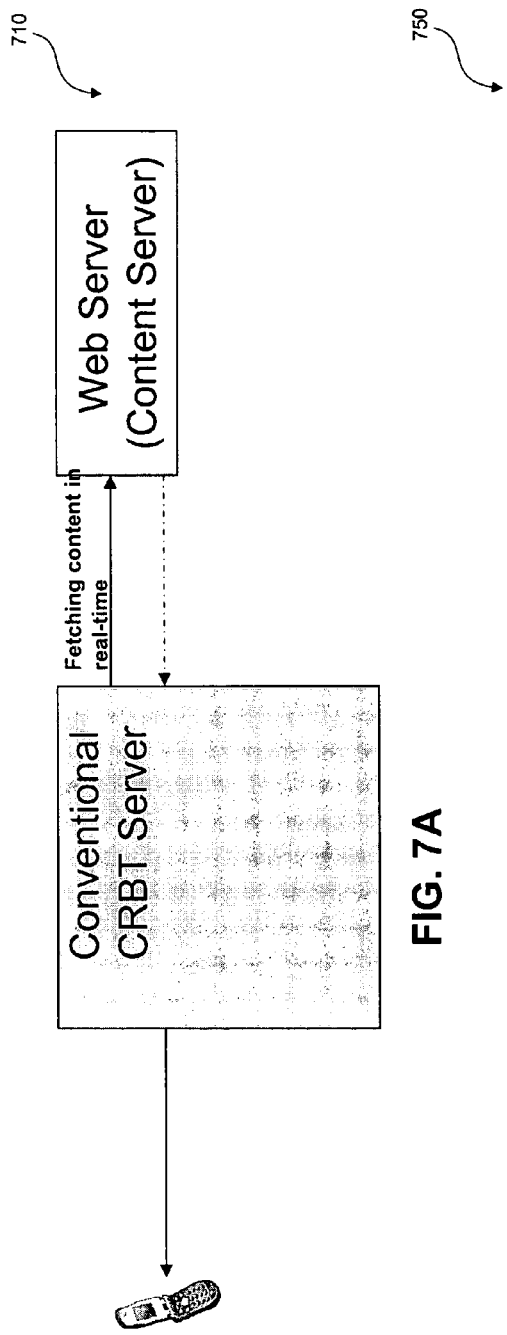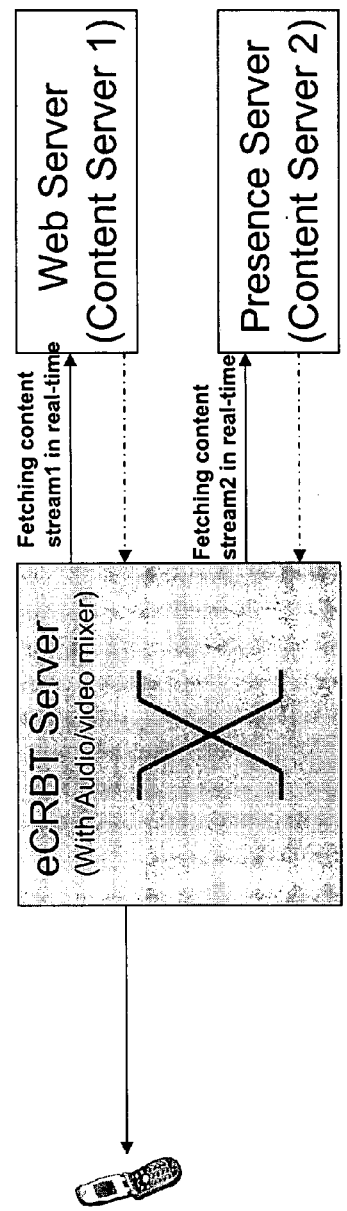
FIG. 7A
FIG. 7B

ENHANCED COLORFUL RING-BACK TONE BY MIXING CONTENT STREAMS IN REAL TIME

CROSS-REFERENCE TO RELATED APPLICATIONS

The present application claims the benefit of Indian Provisional Patent Application No. 603/KOL/2006, filed on Jun. 16, 2006, which is incorporated herein by reference in its entirety.

BACKGROUND OF THE INVENTION

1. Field of the Invention

The invention relates generally to telephony-related enhanced services, and more specifically to the generation and delivery of customized ring-back tones blending a plurality of content streams in real time.

2. Background Art

Innovative ways of delivering digital content to end users connected to an existing communications network (e.g. the Internet, the Public Switched Telephone Network (PSTN), a wireless communication network etc.) is an area with tremendous commercial potential. Tailoring digital content according to an end user's preference for enhanced communication experience has opened up new avenues of revenue generation for service providers.

Previously, when a calling party initiated a call to connect to a called party, the calling party would typically hear a traditional ring-back tone ("tring-tring") or a beeping sound in the time period before the called party answered. Since then, ring-back tones have developed from simple sounds to songs and other audio files, such as stereo MP3 files. More recently, pre-produced video clips are being streamed to the calling party, in the time period between a call set up and an answer. This is known as a video ring-back tone, where the calling party not only hears a ring-back tone, but also sees an accompanying video clip on his/her handset screen. The video clip may include real video data—not just animated pictures.

Service providers also use audio/video ring-back tones for self promotion, or offer a variety of distinctive ring-back tones to be purchased by the called party, who subscribes to a premium service. The premium service is often known as Colorful Ring-Back Tone (CRBT) service or Personalized Ring-Back Tone (PRBT) service.

Although CRBT is available as a premium service to a subscriber, the deficiency in the current approach is that the called subscriber can only select a single content stream or pre-merged multiple content streams to be played as ringback tone. In the case where multiple files or streams are involved, the files or streams are either played consecutively or if required to play simultaneously, they are mixed prior to storing in the content server. Unless the service provider creates the content in a studio earlier, which is a very expensive approach, there is no seamless experience to the caller. For example if a called subscriber wants a caller to hear a pre-recorded greeting as well as a piece of music, then current CRBT implementations play the greeting followed by the music. The transition between the two contents may be quite abrupt, such that the caller may get confused regarding the status of the call. This abrupt transition does not provide a satisfying experience to the caller, which may be a cause of concern particularly for business enterprises, who aim to provide a high level of customer satisfaction.

There are existing implementations where multiple content streams or files are mixed offline and then played as a single stream in real time. A deployment based on offline content mixing has severe limitations in a number of scenarios. For example, this scheme does not work when one of the content streams is a real-time stream coming from a third party server (e.g. a radio stream). Additionally, this scheme does not allow subscribers to select random contents from a jukebox library. This approach is very resource-heavy and not practical to implement when multiple parties are involved in selection of the content (for example when a service provider or an employer wants their signature tune as back-ground to the CRBT subscriber's greeting), or content needs to be customized for each caller or needs to be altered depending on the current time or date. All these features require hundreds of mixed files to be created in advance putting undue pressure on the processing and storage capacity. The present invention described in this application removes these constraints by mixing the content streams in real time.

With the growing popularity of CRBT services, especially among the commercially pivotal demographic groups of subscribers, service providers need distinctive features to enhance the appeal and utility of CRBT services without incurring excessive charges to the subscribers. What is therefore needed is a system and method to seamlessly mix multiple content streams in real time in a ring-back tone.

BRIEF SUMMARY OF THE INVENTION

Embodiments of the present invention provide methods and systems for enhancing CRBT services by seamlessly mixing multiple digital content streams in real time, including but not limited to audio, video, data, text-based message, and hypermedia object streams.

In one aspect of the invention, a first enhanced CRBT (eCRBT) content stream starts playing immediately after an incoming call is placed. One or more properties of the first content stream are altered, such that a prominence of the first content stream is eventually reduced. A second content stream in seamlessly introduced by increasing the prominence of the second content stream relative to the first content stream. Example properties of the content streams to be altered include volume and pitch for audio streams, and brightness and relative layout of video streams. The invention is applicable to more than two content streams as well, and there are no theoretical or practical limitations on how many content streams can be presented to the caller.

In another aspect of the invention, multiple content streams are mixed and the multiple content streams start playing simultaneously as soon as the incoming call is placed. An eCRBT controller produces a seamless and coherent experience to the caller by controlling various properties in the streams (such as volume or pitch in case of audio streams, and brightness and layout in case of video streams) with time.

In one embodiment of the invention, an application server controls mixing and playing of digital content by an internal algorithm. In another embodiment, mixing and playing of content stream is controlled by subscriber input received through provisioning interfaces, such as a voice-based interface, WAP-based interface, web-based interface, SMS-based interface, USSD-based interface, etc.

In another aspect of the invention, personalized content streams can be mixed and played in real-time based on interactive response received from a calling subscriber.

In a further aspect of the invention, subscriber-chosen content may be mixed with promotional and informational content from the service provider or other advertisers. Subscriber-chosen content may also be mixed with real-time information regarding the called party's current availability or status.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the relevant art to make and use the invention.

FIGS. 7A and 7B show the difference between conventional CRBT and eCRBT.

The present invention will be described with reference to the accompanying drawings. The drawing in which an element first appears is typically indicated by the leftmost digit(s) in the corresponding reference number.

DETAILED DESCRIPTION OF THE INVENTION

Overview

Figure 1:
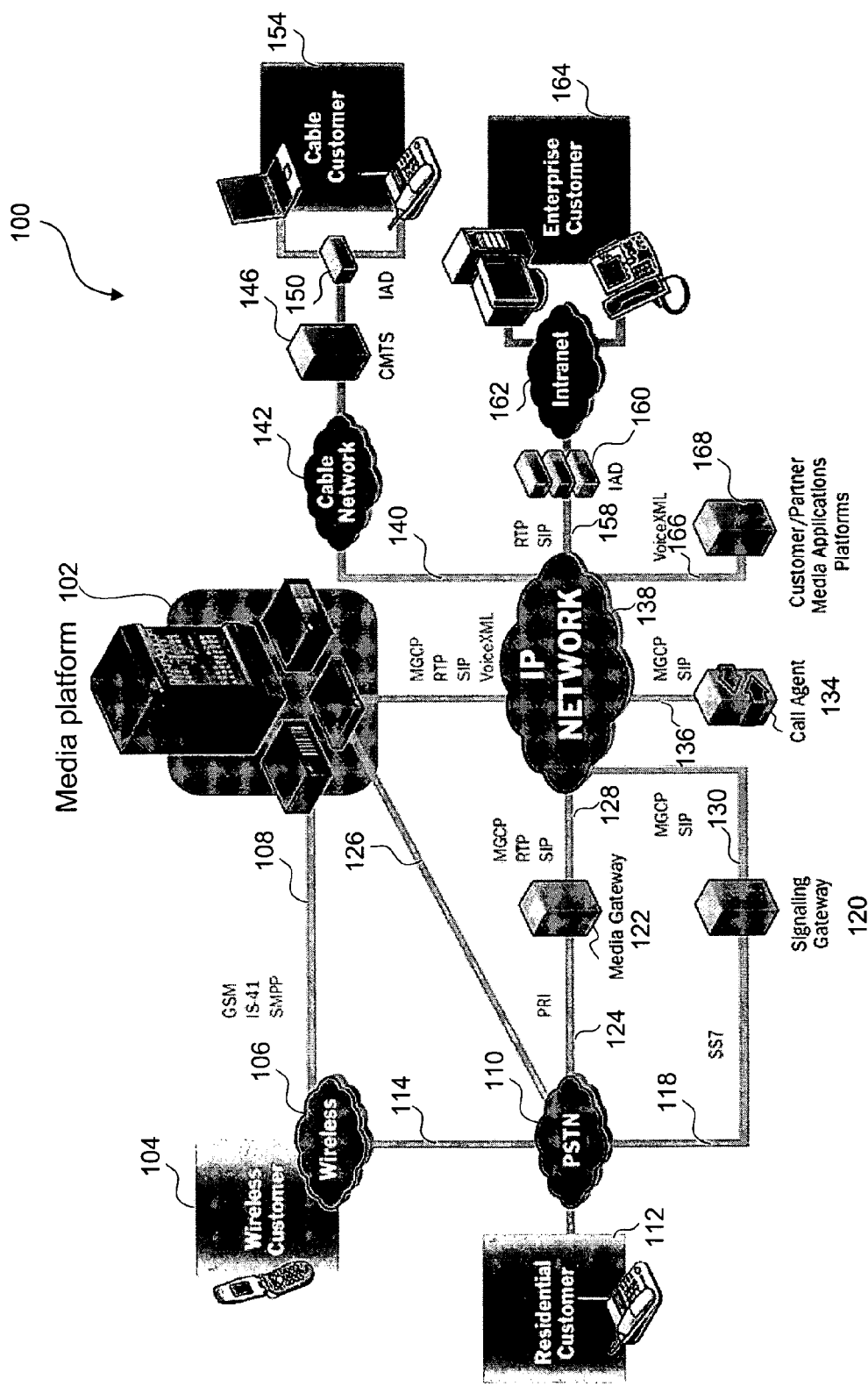
FIG. 1 shows an enhanced CRBT (eCRBT) solution deployed seamlessly in different telecom networks.

With rapidly evolving technology, customers have started to expect enhanced services and superior communication experience available over existing network infrastructure. This is especially true for wireless device users. Currently, CRBT is available as a premium service to a subscriber, who intends to send a distinctive, and often individualized, ring-back tone when a caller initiates a call directed to the subscriber.

Embodiments of the present invention provide methods and systems for enhancing conventional CRBT by seamlessly mixing multiple digital content streams, including but not limited to audio, video, data, text-based message, and hypermedia object streams. The content streams may be static or dynamic, e.g. pre-stored data files, or data being streamed in real-time from a content server. Logical components of this system are an eCRBT application server and a content mixer (e.g. an audio/video mixer) or a conferencing server, implemented on a media server. The mixer or conferencing server may be implemented in hardware, firmware, software, or a combination thereof. Selection of content streams can be determined either by an algorithm on the eCRBT application server or can be configured by the subscribers (or the end users) of the system using provisioning interfaces supplied by the eCRBT application server. Provisioning interfaces include but are not limited to web, WAP, desktop client, SMS, USSD, voice portal, etc. A CRBT application server may also control features like volume and/or pitch (in case of audio streams), brightness and relative layout (in case of video streams) for each of the streams, thus enhancing the audio-visual experience of the caller significantly.

For example, an eCRBT application may start with playing a song to the caller after the call is initiated. The song then gradually fades-away to be overlaid by a subscriber greeting that gradually fades-in. Once the greeting is nearing its end, it starts to gradually fade-away and gets replaced by the song, which gradually fades-in. This seamless experience requires that two content streams (both audio in this case) to be mixed and played simultaneously in real-time. In the case of video streams, a first video clip may start playing with high brightness, filling all of most of the caller's handset video screen. After some time, the first video clip may start to zoom out, while a second video stream starts to zoom in, and gradually fills in the video screen.

One or more of the content streams can be replaced by an advertisement or informational content from the service provider. This allows the service provider to promote itself or generate advertising revenue by promoting other business entities, while reducing service fees charged to the eCRBT subscriber.

There are a number of ways of mixing promotional material with subscriber-chosen content. For example, the service provider may play a greeting from the subscriber in the foreground, i.e. at a higher volume, while playing the service provider's theme music (branded tune which identifies the service provider) in the background at a lower volume. This way, the called subscriber's content is delivered to the caller, and at the same time, allows the service provider to do brand promotion especially to the callers who may be calling from other service provider networks.

Mixing of content streams in real time allows service providers to insert toll saver announcements along with the subscriber's choice of ring-back tone. For example, when the subscriber is roaming, along with the subscriber's content, the service provider can insert a toll saver announcement, such as "This subscriber is roaming, please disconnect if this is a telemarketing call." This will save the subscriber's roaming charges because of telemarketing calls. Another way the service provider can offer enhanced features is to provide prerecorded call screening announcements such as, "Called party does not accept telemarketing calls. If you are a telemarketer, please disconnect immediately and put this subscriber number in your Do-Not-Call list." All these announcements can be played along with the subscriber's selected content.

Another similar application would be the automatic insertion of an announcement embedded in the subscriber-chosen message. The embedded announcement provides the presence or availability status of the subscriber. For a fee, the service provider can offer a presence service that would play an announcement in case the subscriber is roaming. This is particularly applicable for subscribers who travel and desire to save roaming charges from unnecessary calls. As an example, if the network is capable of inserting the message that the called subscriber is roaming, the callers can determine if the call is really necessary, and thereby save the caller roaming charges on non-urgent calls.

Mixing of multiple streams from different sources in real time allows for scaling of service solutions by the network service providers. Specifically this invention shows methods and apparatuses for real-time or near-real-time content blending with subscriber-chosen content into a single output message or ring-tone.

Example Operational Environment

The present invention is agnostic to the type of telephone network. For example, the present invention can be implemented in a Voice-over-Internet-Protocol (VOIP) network, but is not limited to VOIP implementations.

The following description includes a number of standard abbreviations used industry-wide. Please see Appendix A for the full forms of the abbreviated acronyms.

FIG. 1 shows an example network environment 100 for providing an enhanced CRBT (eCRBT) solution to calling parties serviced by multiple different communication networks. Network environment 100 includes a data communication network, such as an Internet-Protocol (IP) network 138, to which a media platform 102 is coupled. As would be appreciated by persons of skill in the art, other types of data networks can be used with the present invention. Media platform 102 may have several components, such as media servers, logic-based application servers, gateways etc., as will be discussed further below. IP network 138 is coupled to various other example networks and components. As shown in FIG. 1, IP network 138 is coupled to a PSTN 110 via a media gateway 122 and a signaling gateway 120, where PSTN 110 is connected to residential customers 112. IP network 138 is also coupled to a cable network 142, which is connected to cable customers 154 via a Cable Modem Termination System (CMTS) 146 and an Integrated Access Device (IAD) 150. IP network 138 is also coupled to an Intranet 162 via an LAD 160, where Intranet 162 serves an enterprise customer 164. Also connected to IP network 138 are one or more call agents 134, and one or more customer/partner media applications platforms 168, as shown in FIG. 1.

IP network 138 is coupled to a wireless network 106 through PSTN 110. Wireless network 106 serves wireless customers 104. Note that, specific wireless networks, such as a third generation (3G) network may be coupled directly to media platform 102 via a link 108 (as shown in FIG. 1) connected to a gateway, or it may be coupled to media platform 102 through PSTN 110.

FIG. 1 also shows inter-component links 108, 114, 126, 124, 128, 130, 118, 136, 132, 140, 158, and 166. Various protocols (e.g. GSM, IS-41, SMPP, MGCP, SIP, RTP etc.), as applicable, are used for communication between the components of network environment 100 via the corresponding links, as shown in FIG. 1. For example, the Session Initiation Protocol (SIP) used for communications between IP network 138 and PSTN 110 is considered by many as the leading signaling protocol for multimedia applications such as IP telephony applications, instant messaging, and online games etc.

Figure 2B:
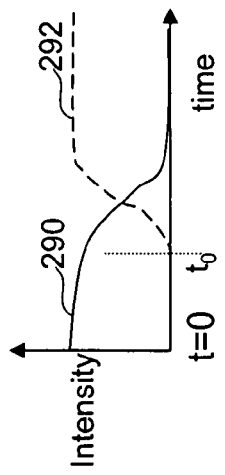
FIGS. 2B-2C show example time variation of prominence of eCRBT content streams with respect to each other.
Figure 2C:
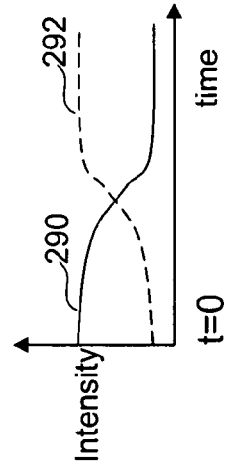
Figure 2A:
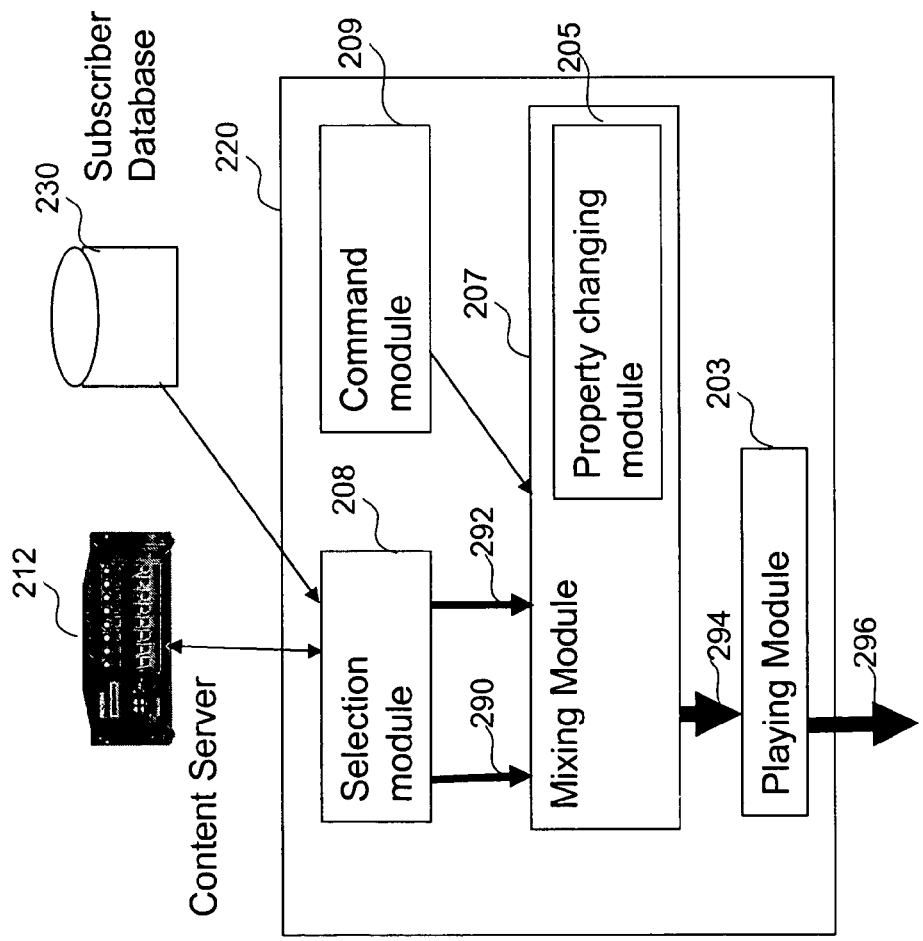
FIG. 2A shows components of an eCRBT controller according to an embodiment of the present invention.

FIG. 2A shows some of the key components for implementing eCRBT services, according to an embodiment of the present invention.

In FIG. 2A, an eCRBT controller 220 is shown with example sub-components.

The eCRBT controller 220 includes a selection module 208, a command module 209, a mixing module 207 which includes a property changing module 205, and a playing module 203 among other subcomponents.

Selection module 208 may be coupled to a subscriber database 230, which contains information related to individual subscribers and their preferences. For example, if an eCRBT subscriber wants caller 'X' to hear mixed content stream 'A', and caller 'Y' to hear mixed content stream 'B', that information is stored in database 230, and is accessed by selection module 208 using SQL language.

Selection module 208 is also coupled to a content server 212 which may serve as a repository of various content streams available for the subscriber to choose from. For example, selection module 208 chooses streams 290 and 292, and sends them to mixing module 207. More than two content streams may be selected by selection module 208.

Command module 209 issues a command for creation of a mixed content stream containing the selected content streams mixed in real time by altering one or more properties of the content streams within a time interval.

Mixing module 207 mixes selected content streams to generate a mixed content stream 294 according to the command issued by command module 209, and sends the mixed content stream 294 to playing module 203.

Property changing module 205 may be included in mixing module 207, as shown in FIG. 2A, or may be a separate module coupled to mixing module 207. Property changing module alters one or more properties of the selected content streams with time For example, property changing module 205 may gradually reduce the volume of an initial audio stream after 5 seconds, while increasing the volume of another audio stream. In case of video streams, the brightness or relative layout of a video screen may be varied.

FIGS. 2B-2C show examples of time variation of relative intensities of two content streams according to a command issued by command module 209. In FIG. 2B, a first content stream 290 starts playing at a high intensity initially, i.e. at t=0. After a predetermined time to has elapsed, a second content stream 292 is introduced. After $t=t_0$, property changing module 205 gradually enhances the prominence of stream 292, while gradually diminishing the prominence of stream 290 by varying the intensities of individual streams. Based upon the selection criterion of the user, after a time interval, stream 290 again gradually intensifies, while stream 292 gradually recedes. This process is continued until the called party picks up the call.

In FIG. 2C, an alternative scheme of content stream mixing is depicted. In this case, both content streams 290 and 292 are playing simultaneously at t=0. However, stream 290 plays in the foreground with a higher prominence, and stream 292 plays in the background with a lower prominence. Property changing module 205 gradually enhances the prominence of stream 292 so that stream 292 gradually comes to the foreground, while stream 290 gradually recedes to the background.

Mixing concepts illustrated in FIGS. 2B-2C are applicable for more than two streams as well. Also, property variation does not necessarily occur gradually. It may occur in discrete steps at various instances of time predetermined by the subscriber or the system.

Output of mixing module 207 is the mixed content stream 294, which is received by playing module 203. Output 296 is the mixed content stream with time-varying properties that the caller hears or sees when the caller places a call to an eCRBT subscriber called party before the called party picks up the call.

It is noted that eCRBT controller 220 including modules 203, 205, 207, 208, and 209 may be implemented in hardware, software, firmware, or a combination thereof. Furthermore, while functionality is shown in separate modules 203, 205, 207, 208, and 209, the invention is not limited to this configuration only. In other embodiments, functionality can be carried out in one module or distributed across two or more modules. eCRBT controller 220 may reside in a media server, in an application server, or may be distributed between the media server and the application server. The components of eCRBT controller 220 residing in an eCRBT application server are sometimes collectively called a "Tone Server". The media server may be a server dedicated to eCRBT applications, or it may be a commercial server with multiple services including eCRBT services. Similarly, the application server may be a multi-service commercial server, or a dedicated eCRBT server.

Figure 2D:
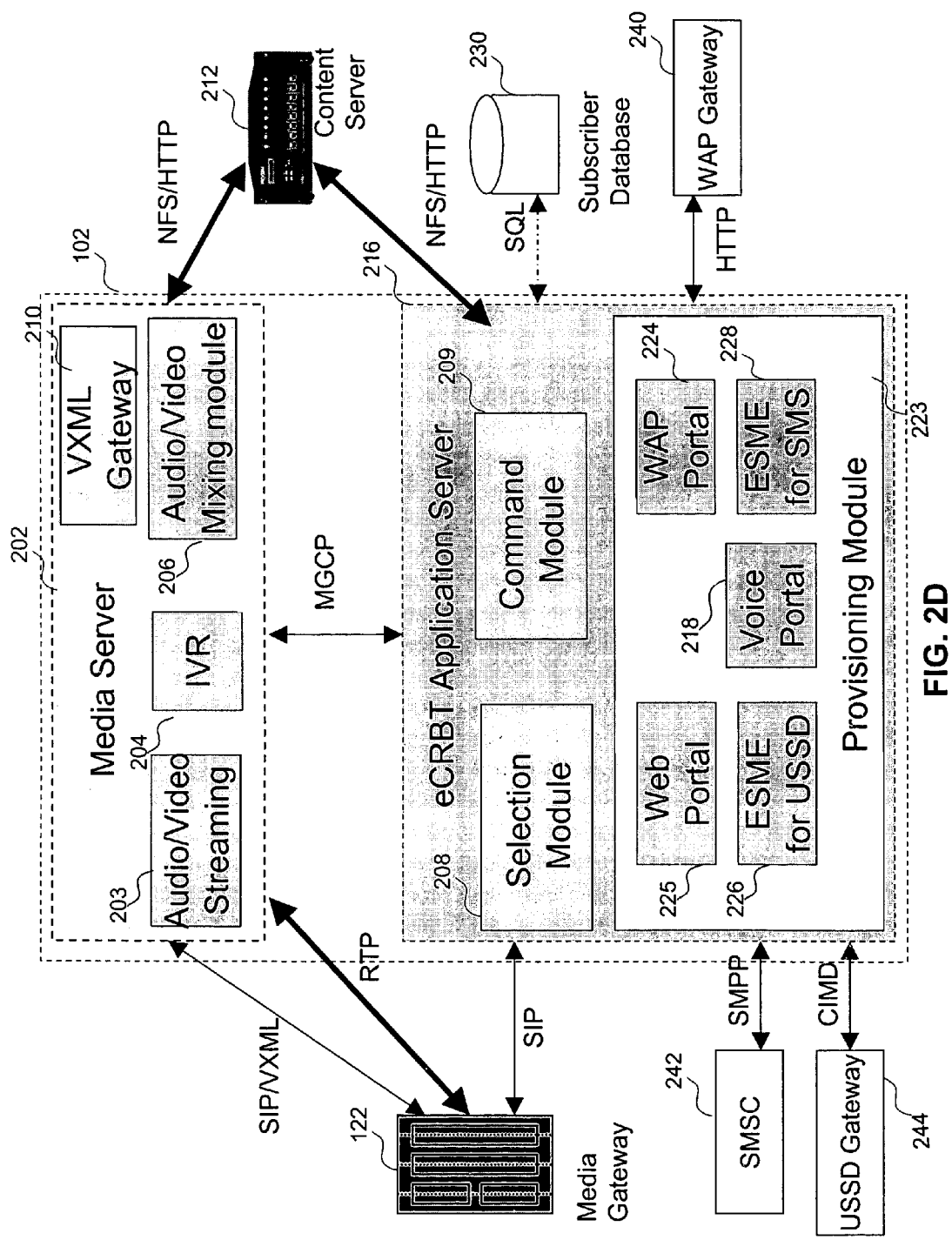
FIG. 2D shows an example infrastructure for implementing eCRBT services.

As shown in FIG. 2D, in one embodiment, components of eCRBT controller 220 are distributed in an eCRBT application server 216, and a media server 202. Media server 202 and eCRBT application server 216 may be included in media platform 102 as described in FIG. 1. Media server 202 and eCRBT application server 216 are coupled to eCRBT subscribers via media gateway 122. In a VoIP network (wire-line or wireless), media gateway 122 will not be necessary.

Media server 202 is capable of the basic functions like streaming audio/video, DTMF collection, Access Service Request (ASR), Text-to-Speech (TTS) conversion, audio/video mixing, volume control, conferencing, encoding, decoding, trans-coding, trans-rating, compression etc. Media server 202 may include an audio/video streaming module 203, Interactive Voice Response (IVR) module 204, an audio/video mixing module 206, and a VXML gateway 210 among other components. Both media server 202 and application server 216 may be coupled to content server 212. Media server 202 may have more components that are not shown in FIG. 2D.

The eCRBT application server 216 has some of the components of the eCRBT controller 220, such as selection module 208, and a command module 209. The eCRBT application server 216 may also have a provisioning module. Provisioning module 223 may contain one or more of the following: a voice portal 218, a web portal 225, a WAP portal 224, an External Short Message Entity (ESME) for Unstructured Supplementary Service Data (USSD) 226, and an ESME for SMS 228. Application server 216 may have more components that are not shown in FIG. 2D. Application server 216 may be coupled to subscriber database 230.

Selection and playing sequence of content streams can be determined either by an algorithm on eCRBT application server 216 when subscriber selection is not specified, or can be configured by the subscribers using provisioning interfaces supplied by eCRBT application server 216, such as web-based provisioning, WAP-based provisioning, SMS-based provisioning, voice-based provisioning, USSD-based provisioning etc. via corresponding gateways. For example, WAP gateway 240, Short Message Service Center (SMSC) 242, and USSD gateway 244 are used respectively for WAP-based, SMS-based, or USSD-based provisioning.

The above described components as shown in FIG. 2D are example components. Depending on the method of choice for implementing eCRBT services, various embodiments may include all or some of the components. Additionally, functionality of different modules described in FIG. 2D may be distributed across more than one components in alternative embodiments.

For example, one embodiment of the eCRBT solution may contain a voice portal module 218 in the provisioning module 223 in the application server 216, which the subscribers can use to configure eCRBT streams of their choice using a phone interface. Voice portal module 218 comprises a voiceXML based web application module (not shown) on application server 216, and interfaces with IVR module 204 and VXML gateway 210 on media server 202. VXML gateway 210 provides interpretation of VXML pages served by the web application module included in the voice portal module 218. Playing module 203 of the eCRBT controller 220 is coupled to IVR module 204 and audio/video streaming module 203 on media server 202. IVR module 204 collect subscriber input via speech or DTMF, and transmits them to provisioning module 223.

Please note that the various protocols shown being used for communication between the components in FIG. 2D (e.g. MGCP protocol for communication between media server 202 and application server 216) are not the only protocols applicable, and may vary depending on a particular implementation.

Figure 3:
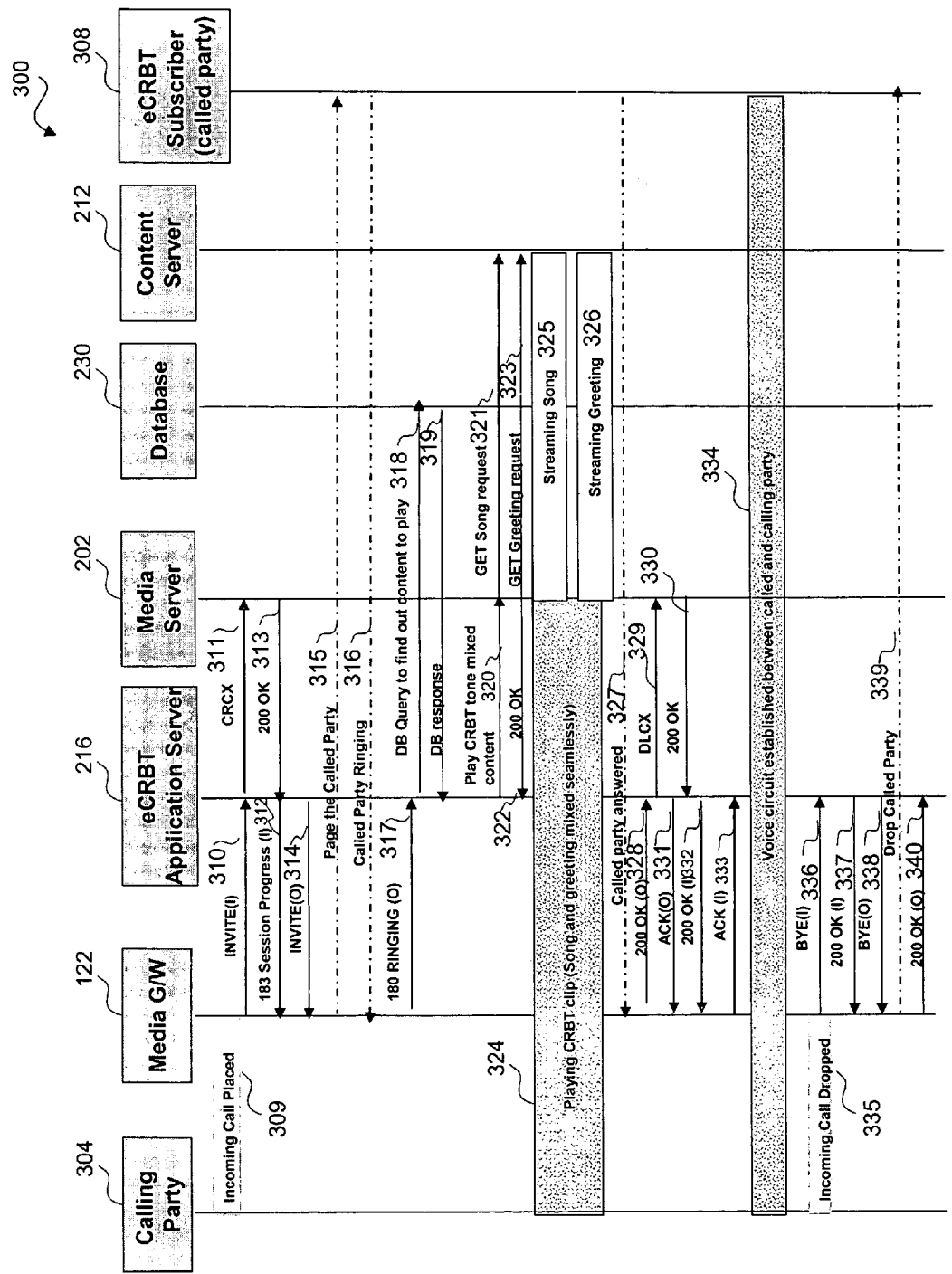
FIG. 3 shows an example call flow diagram for eCRBT when a calling party initiates a call to a called party, who is an eCRBT subscriber.

FIG. 3 shows an example call flow diagram 300 for eCRBT when a calling party 304 initiates a call to a called eCRBT subscriber 308. Note that a calling party may not be an eCRBT subscriber.

As shown in FIG. 3, example component hubs through which call flow happens include a media gateway 122, an eCRBT Application Server 216, a media server 202, a database 230, and a content server 212. Note that in general a '200 OK' signal transmitted from one component to another component means that the 'request has succeeded'.

When a calling party (such as a calling subscriber 304) initiates a call 309, the calling party communicates with media gateway 122, and a call set-up is transmitted from media gateway 122 to eCRBT application server 216. Note that media gateway 122 sets up a call first with application server, as the dialed number has been pre-provisioned on media gateway 122 as an eCRBT subscriber.

Media gateway 122 sends incoming invite request INVITE (I) 310 to application server 216. Application server 216 sends a message CRCX 311 to media server 202. Media server 202 sends back a 200OK message 313 to application server 216, which in turn sends a '183 Session Progress (I)' message 312 and outgoing INVITE (O) message 314 to media gateway 122. Outgoing INVITE (O) message 314 from application server 216 instructs media gateway 122 to initiate an outgoing call to called party, eCRBT subscriber 308. Media gateway 122 then pages the called party subscriber 308 by sending a message 315. The paging mechanism depends on the type of telecom network in use. In response, a called party ringing message 316 is sent back to media gateway 122.

While the caller is waiting for the called party to pick up the call, the caller gets to hear eCRBT tones if the called party happens to be an eCRBT subscriber. After getting message 316 back, media gateway 122 sends a '180 Ringing' message 317 to application server 216. Message 317 triggers application server 216 to start playing eCRBT tones as requested. The application server 216 sends a database query message 318 to database 230 to find out what content to play for the particular caller, and receives a response message 319 from database 230. Response message 319 has instructions for playing a mixed content in a predetermined pattern. The application server 216 relays an instruction message 320 to media server 202 for playing the mixed content in the desired pattern (e.g. playing a subscriber greeting in the foreground with a music clip in the background.) The subscriber greeting and the music clip may come from different physical sources. For example, the subscriber greeting may come from a presence server (not shown), and the music clip may come from a content server. In the example shown in FIG. 3, both the individual content streams are coming from content server 212.

Media server 202 sends a 200 OK message 322 to eCRBT application server 216, and sends a 'GET Song' request 321 and 'GET Greeting' request 323 to content server 212. Requests 321 and 323 may be transmitted simultaneously bundled together, or they may be sequential. Content server 212 then starts streaming the selected song 325 and selected greeting 326 to media server 202, so that media server can play seamlessly-mixed eCRBT clip 324 to the calling party.

Note that all these communications described above happen before the called party answers the call. Some of the requests shown are not actual protocol requests (e.g., GET song request) but general descriptions which may translate into different messages according to the protocol used in a particular deployment.

Once the called party answers the call, i.e. picks up the phone, a message 327 is sent from the called party's terminal device (e.g. phone) to media gateway 122. Message 328 (200 OK from media gateway 122 to application server 216) indicates to application server 216 that called party eCRBT subscriber 308 has answered the call. In response, to message 328, application server 216 sends a DLCX message 329 to media server 202. Media server 202 then drops the media connection, and stops the playing of eCRBT streams to calling party 304. Media server 202 acknowledges dropping of media connection by 200 OK message 330 sent to application server 216. Message 331 (acknowledgement message ACK (O) from application server 216 to media gateway 122), message 332 (200 OK (I) from application server 216 to media gateway 122), and message 333 (acknowledgement message ACK (I) from media gateway 122 to application server 216) are exchanged before a voice circuit 334 is established between the calling party and the called party indicating the point of starting of oral conversation, and possibly, generation of billing records.

When the calling party drops a call, the calling party and media gateway 122 exchange communications 335 indicative of the calling-party going on-hook. Media gateway 122 sends a message 336 (BYE (I)) to application server 216, which sends a 200 OK(I) message 337 back to media gateway 122. Message 336 received from media gateway 122 triggers application server 216 to send a BYE (O) message 338 to media gateway 122 instructing it to drop the connection to the called party eCRBT subscriber 308. Media gateway 122 then sends a 'drop called party' message 339 to called subscriber 308 and a 200 OK message 340 to eCRBT controller. Thus the call ends.

Note that FIG. 3 describes a scenario where the calling party ends the call. A similar exchange of messages may occur on the called party side when the called party ends the call.

Additionally, FIG. 3 only shows one particular embodiment where media gateway 122 is the switching component, and SIP is assumed to be the protocol between switching component and eCRBT application server 216. In different telecom networks, this switching component may be a softswitch or a proxy-server (e.g. in the case of a VOIP network). The invention is not limited by the actual switching component or protocol used between the switching component and eCRBT application server 216.

Figure 4:
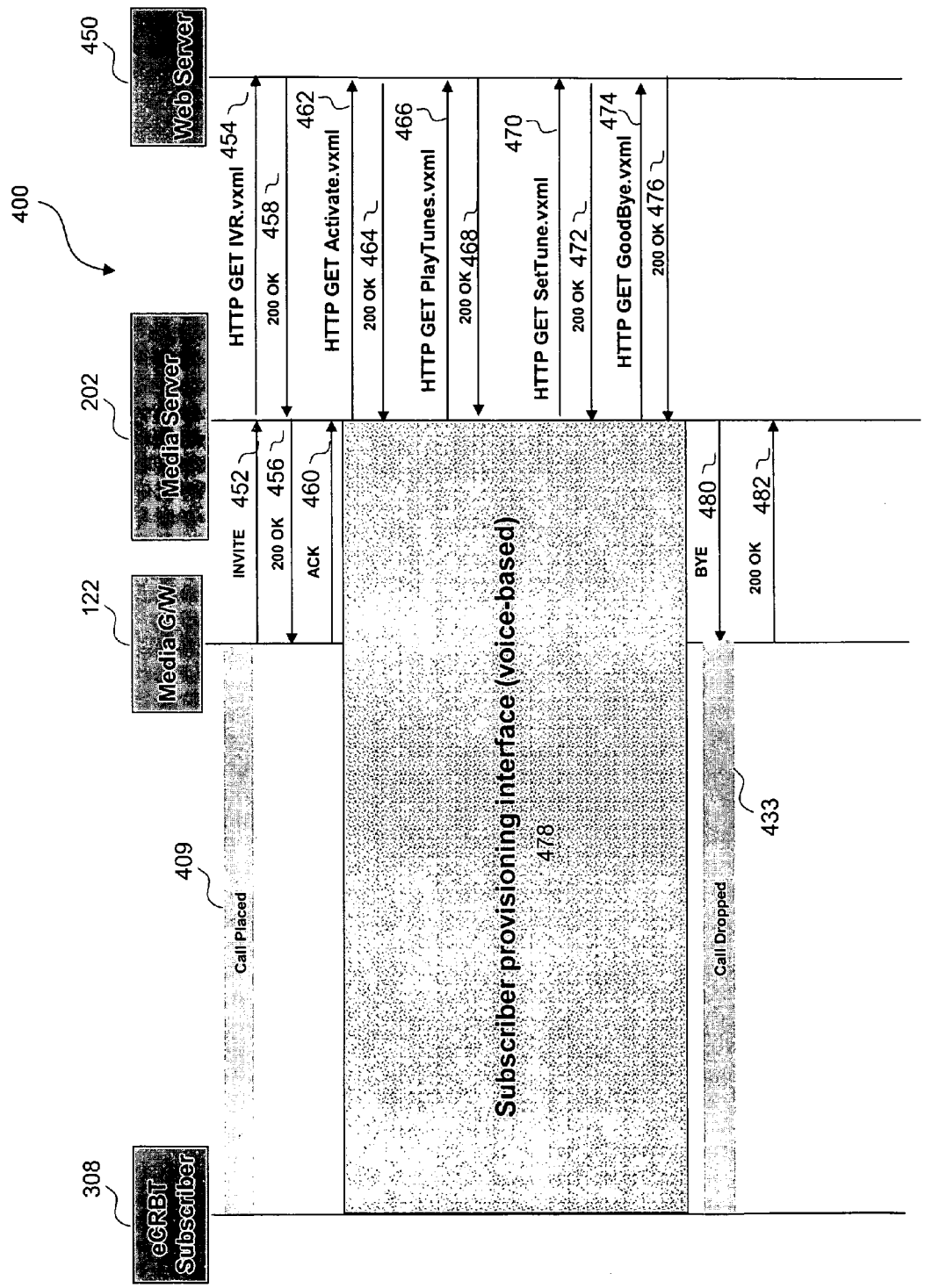
FIG. 4 shows an example call flow diagram for eCRBT when an eCRBT subscriber initiates a call to an eCRBT voice portal for service provisioning.

FIG. 4 shows an example call flow diagram 400 for eCRBT when an eCRBT subscriber initiates a call to a CRBT voice portal for setting up his preferences. In this example, a web server 450 acts as an application server that includes a voice portal.

Once a calling subscriber 308 places a call 409 in order to access an eCRBT voice portal, media gateway 122 sends an INVITE message 452 to a media server 202. Media server 202 may have a VXML gateway, and communicates with web server 450 using HTTP messages. Media server 202 sends a 'HTTP GET IVR.vxml' message 454 to web server 450, and gets back a 200 OK message 458 along with VXML script to control the user interaction with the subscriber. Media server 202 then sends another 200 OK message 456 to media gateway 122, and media gateway 122 acknowledges, sending an ACK message 460 thus establishing a call between the called party and the provisioning application on the web-server.

Calling subscriber 308 is provided with a provisioning interface through which subscriber 308 can select which CRBT clip he/she wants to be played out to a particular caller. In the example shown in FIG. 4, provisioning interface 478 is a voice-based interface, where subscriber 308 hears provisioning CRBT tones, and is enabled to send voice-based selection messages. During provisioning, media server 202 sends HTTP messages, such as a message 462 (HTTP GET Activate.vxml), a message 466 (HTTP GET PlayTunes.vxml), and a message 470 (HTTP GET SetTune.vxml), to web server 450, requesting various service options. Web server 450 responds by sending corresponding 200 OK messages (messages 464, 468, and 472) indicating that the requests have been processed. Once all desired selections are made, media server 202 sends a session ending message 474 ('HTTP GET GoodBye.vxml') to web server 450, and web server 450 sends a concluding 200 OK message 476.

Call-flow described above describes an audio CRBT service implementation, where the chosen content streams are audio streams. Similar call-flow can also be realized for selection of video content. The difference will be that a subscriber will call from a video phone and video clips will be streamed to him/her instead of audio clips while making his/her selection.

After the provisioning is completed, media server 202 sends a message 480 (BYE) to media gateway 122. This drops the connection between eCRBT subscriber 308 and the media gateway. Media gateway 122 sends a 200 OK message 482 to disconnect from media server 202.

Figure 5A:
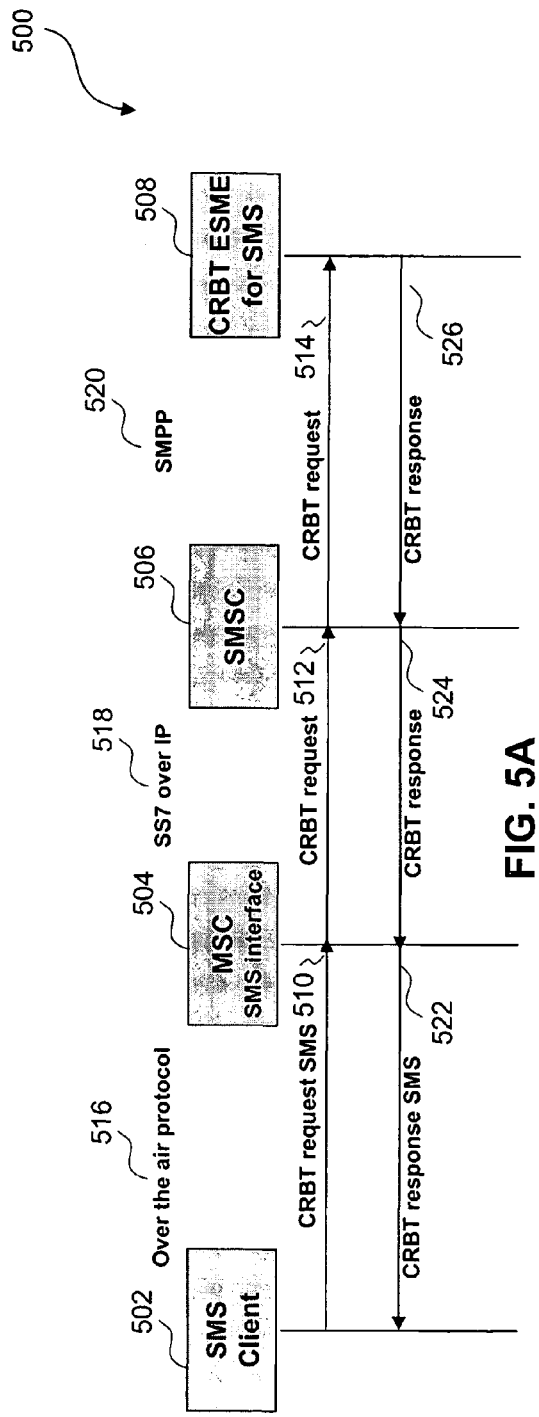
FIGS. 5A and 5B show SMS and USSD based eCRBT provisioning, respectively.

FIG. 5A illustrates a simplified call flow diagram 500 showing an SMS-based provisioning similar to the voice-based provisioning shown in FIG. 4. A calling subscriber in this case is an SMS client 502. SMS client 502 sends a CRBT request SMS 510 to a Mobile Switching Center (MSC) SMS interface 504. MSC SMS interface 504 relays a CRBT request message 512 to a Short Message Service Center (SMSC) 506. SMSC 506 transmits a CRBT request message 514 to CRBT ESME for SMS 508 (which is included in a CRBT application server). CRBT ESME 508 sends a CRBT response 526 to SMSC 506. SMSC 506 sends a CRBT response 524 to MSC SMS interface 504. MSC SMS interface 504 then sends a CRBT response SMS 522 to SMS client 502. SMS client 502 communicates with MSC SMS interface 504 via a base station (not shown) using an over the air protocol 516. Communication between MSC SMS interface 504 and SMSC 506 takes place using an appropriate protocol, e.g. SS7 over IP protocol 518. Communication between SMSC 506 and CRBT ESME for SMS 508 takes place using SMPP protocol 520.

Figure 5B:
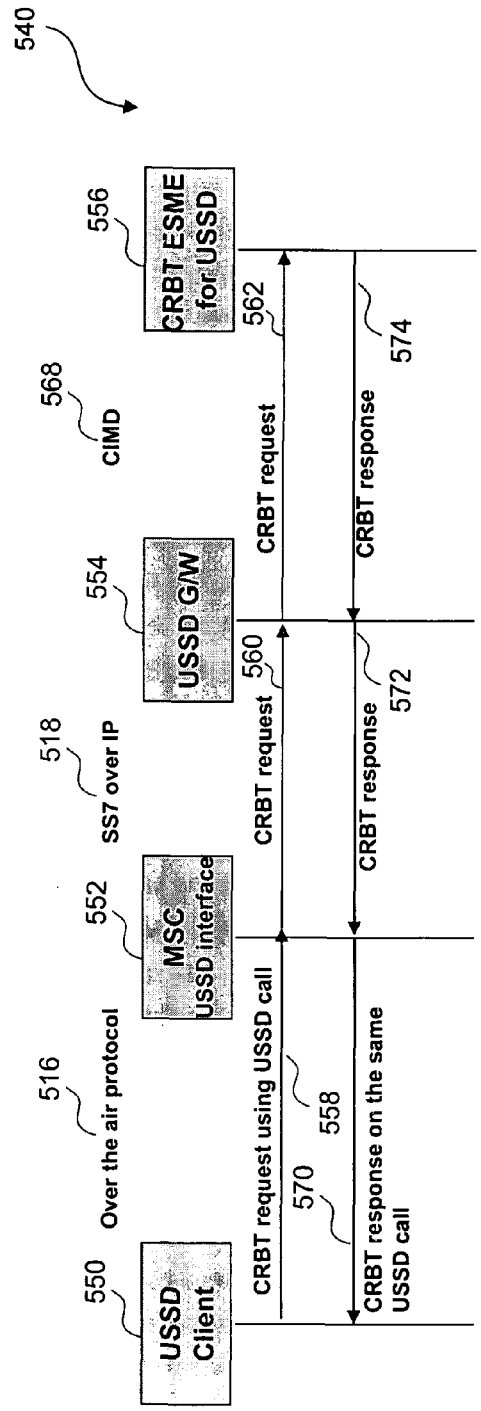

Similar to FIG. 5A, FIG. 5B illustrates a simplified call flow diagram 540 showing USSD-based provisioning. A calling subscriber in this case is a USSD client 550. USSD client 550 sends a CRBT request 558 using a USSD call to an MSC USSD interface 552. MSC USSD interface 552 relays a CRBT request message 560 to a USSD gateway 554. USSD gateway 554 transmits a CRBT request message 562 to CRBT ESME for USSD 556 (which is included in a CRBT application server). CRBT ESME 556 sends a CRBT response 574 to USSD gateway 554. USSD gateway 554 sends a CRBT response 572 to MSC USSD interface 552.

MSC USSD interface 552 then sends a CRBT response 570 on the same USSD call to USSD client 550. Communication between USSD client 550 and MSC USSD interface 552 takes place using over the air protocol 516. Communication between MSC USSD interface 552 and USSD gateway 554 takes place using SS7 over IP protocol 518. Communication between USSD gateway 554 and CRBT ESME for USSD 556 takes place using CIMD protocol 568.

Note that FIG. 4, and FIGS. 5A-5B illustrate how an eCRBT subscriber can set up eCRBT content to be heard or viewed by a calling party when the calling party calls the eCRBT subscriber. The figures also illustrate the concept of how an eCRBT subscriber can enjoy hearing or viewing CRBT clips of his/her choice from a repository of various CRBT clips, similar to a way in which a subscriber can download music or video from an on-demand content provider's server or a music jukebox. Embodiments of the present invention enable on-demand content providers to offer interactive preview services to existing subscribers or potential subscribers.

Figure 6A:
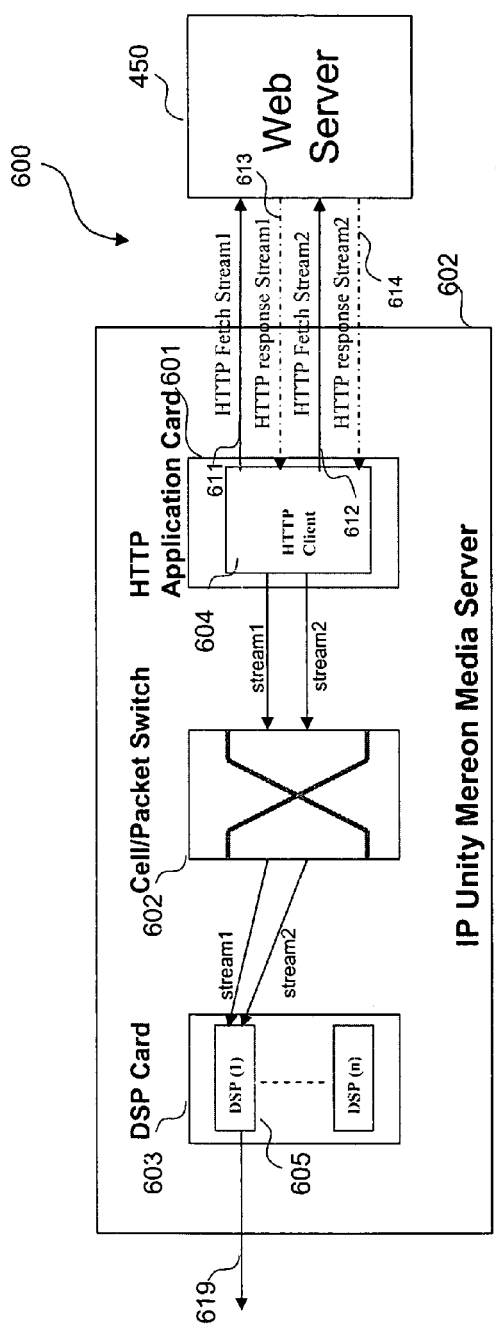
FIGS. 6A and 6B show different components in a media server involved in implementing eCRBT service, according to a specific embodiment of the present invention.

FIG. 6A shows one embodiment of eCRBT implemented using an IP Unity Mereon Media Server 602. Mereon Media Server 602 is one example of media server 202 discussed above. Three main components of media server 602 involved in eCRBT implementation are an HTTP application card 601, a cell/packet switch 602, and a DSP card 603. HTTP client 604 residing in application card 601 makes HTTP request 611 to fetch stream1, and HTTP request 612 to fetch stream2 from a web server 450, which serves as the content server or presence server. Web server 450 responds with stream1 in HTTP response 613 and stream2 in HTTP response 614. HTTP client 604 routes these streams using Cell/Packet switch 602 towards DSP(1) module 605 in DSP Card 603. DSP card 603 has a plurality of DSP modules, DSP(1), DSP(2), . . . . DSP(n) etc, each of which may receive a different set of requested content streams from cell/packet switch 602. DSP(1) module 605 is then responsible to mix stream1 and stream2 in a pattern defined by eCRBT controller 220 and produce a single mixed output stream 619, which is then played to the calling party. Functionally, DSP(1) module 605 comprises of mixing module 207 along with property changing module 205 and playing module 203 of eCRBT controller 220 shown in FIG. 2A.

Figure 6B:
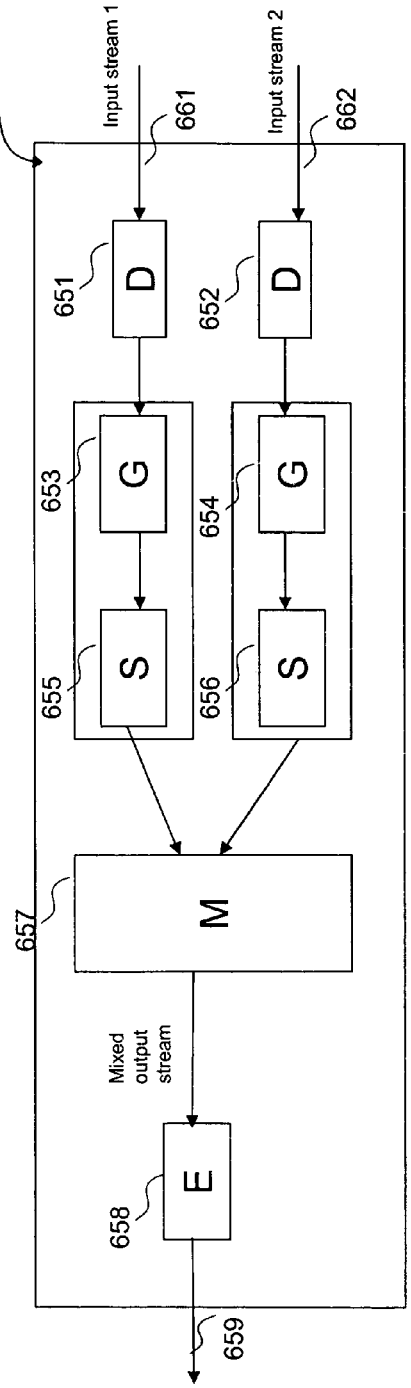

FIG. 6B shows example logical components inside one embodiment of a DSP module 650, which is similar to DSP (1) module 605 shown in FIG. 6A. DSP module 650 acts as an audio mixer. Incoming audio streams 661 and 662 pass through decoders 651 and 652, which decode audio streams 661 and 662 from their original voice codec to raw audio (PCM) streams. These converted streams are then passed through volume gain controllers 653 and 654 which apply the volume gain as dictated by command module 209 of eCRBT controller 220. Audio streams are then passed through volume scalar modules 655 and 656. Volume scalar modules 655 and 656 scale the volumes of individual streams down so that there is no overflow when multiple streams are mixed by mixer 657 to produce a single audio output stream. In general, if there are 'n' streams being mixed, the volume of each stream will be scaled down by 1/n by volume scalar function. After volume scaling, the individual streams are mixed by a mixer 657 according to a predetermined mixing algorithm. Mixer 657 then produces a single PCM output stream which passes through encoder 658. Encoder 658 encodes the PCM stream to a voice codec 659, preferred by the calling party device.

Note that FIGS. 6A and 6B represent just one implementation of eCRBT using a hardware based media server provided by IP Unity. Same eCRBT can be delivered using a software based media server or hardware based media server with different components than those described in FIGS. 6A and 6B. Also, as mentioned earlier, functionality of different components may be distributed among various components in a media server and an eCRBT application server. Again FIGS. 6A and 6B depict only audio mixing. Similar architecture also exists for video streams.

FIGS. 7A and 7B illustrate the differences between a conventional CRBT system 710 and an eCRBT system 750. A conventional CRBT server takes only one input stream (audio/video/text) in real-time and plays it out to the calling party, while an eCRBT server can fetch multiple input streams(audio/video/text) in real time, mix them in real time and play them out to the calling party. The output content stream that the conventional CRBT server fetches may be a product of mixing multiple streams, but that mixing happens off-line, i.e. mixing does not take place when the CRBT call arrives at the CRBT server. This pre-mixing approach precludes the conventional CRBT server from mixing real-time information, such as subscriber presence information along with subscriber pre-configured content (such as a music clip), and play it out as a single seamless stream to the calling party. The present invention is capable of mixing content streams from a plurality of sources or content servers, such as a web server (content server 1), and a network-based presence server (content server 2), as shown in FIG. 7B. A personal calendar server (such as Microsoft Outlook) may also be accommodated in the eCRBT system in place of or in addition to the presence server. These servers can provide real time inputs if the subscriber had provisioned to provide presence or calendar information to specific calling parties. The provisioning system containing the provisioning module similar to module 223 in FIG. 2D determines which of these "services" are applicable, and for which calling parties. It is the responsibility of the application server 216 to apply the content from each of these servers.

Figure 8:
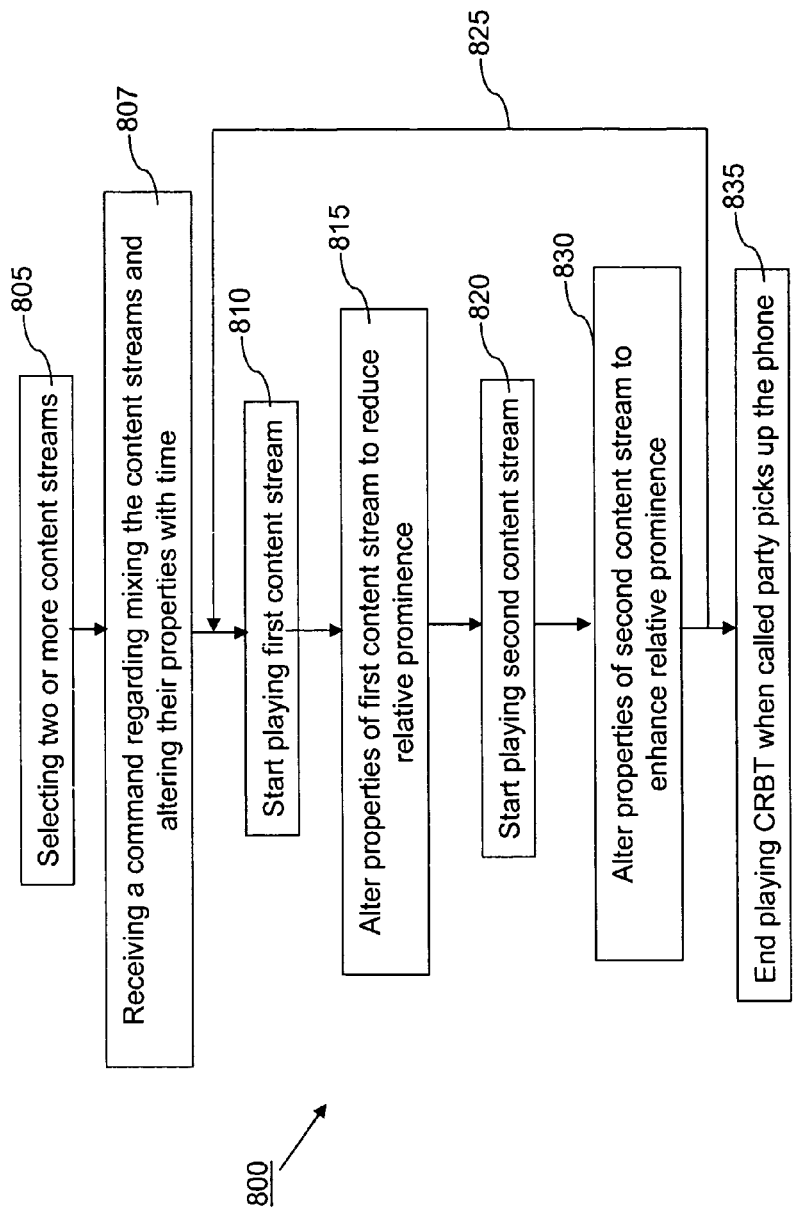
FIG. 8 shows a flowchart describing some example steps of a method to deliver eCRBT according to an embodiment of the present invention.

FIG. 8 shows an example flowchart 800 showing the steps of a method for implementing eCRBT. The method described in flowchart 800 is not limited to any particular embodiment. For example, flowchart 800 illustrates steps which can be implemented by the components discussed in FIG. 2A. Note that the steps of FIG. 8 do not necessarily have to occur in the sequence shown, and some steps may occur concurrently.

Flowchart 800 starts with the selection of two or more content streams, as shown in step 805. Selection module 208 performs this task.

In step 807, a command is received regarding mixing the content streams and altering their properties with time. Command module 209 issues the command. Examples of commands are discussed in the following section titled, 'Examples of Protocol Enhancement Required for eCRBT'.

In step 810, a first content stream starts to be played. Playing module 203 performs this task after receiving the first content stream from mixing module 207.

In step 815, the relative prominence of the first stream is reduced. The reduction may happen gradually or in discrete step(s). Property changing module 205 performs this task according to the command issued by command module 209. For example, the volume of a first audio stream is gradually reduced so that the audio stream gradually fades out.

In step 820, a second content stream starts to be played. Note that the second content stream may already be playing in the background less prominently relative to the first content stream, which is playing in the foreground.

In step 830, the relative prominence of the second stream is enhanced. The enhancement may happen gradually, or in discrete step(s). Property changing module 205 performs this task according to the command issued by command module 209. For example, the volume of a second audio stream is gradually enhanced so that the audio stream gradually fades in.

Steps 810 to 830 are repeated (indicated by the loop 825) until the called party picks up the call.

The method is terminated in step 835 when the called party picks up the phone.

Examples of Protocol Enhancement Required for eCRBT

In this section, specific examples of audio protocol enhancements required for eCRBT are discussed briefly. It is to be appreciated that eCRBT content streams are not limited to audio streams, and may include video, data, text-based message, and hypermedia object streams etc.

The invention requires that application server 216 provide proper commands for the media server 202. To provide a scalable solution providing desired eCRBT services, a key design requirement is to ensure that protocols from application server 216 for message manipulation by the media server 202 are enhanced. By modifications of the protocols at application server 216 and media server 202, the system can provide variations in volume, spatial context, timing, mixing, conferencing and control of individual content streams to provide the best user experience for the caller. There are two protocols, in particular that require enhancements: a) MGCP BAU and AAU and b) VXML.

a) BAU/AAU Design

Currently BAU supports playing of multiple audio/video content consecutively. For example, a command 'PlayAnnouncement' (symbol 'pa') is written as:

S:    pa(an=file://ann1?lang=eng,file://ann2,file://ann3?lang=fra)

This exemplary command enables playing the first part of an announcement in English, the second part in the default language, and the third part in French.

Similarly, a command 'PlayCollect' (symbol 'pc') is written as:

S: pc(ip=file://ann798,file://ann300,file://ann4747dm=x)

This command enables playing a prompt consisting of multiple segments and collecting a single digit as response.

For eCRBT, two audio streams, one background stream (symbol: 'bgn') and another foreground stream, such as an announcement, are mixed. Foreground stream is specified by the symbol 'an' in case of a "PlayAnnouncement" event, and the symbol 'ip' in case of a PlayCollect event. Parameters such as a foreground announcement start delay (symbol: 'sdl'), and a fade duration (symbol: 'fdur') are added in the command to implement eCRBT content stream mixing.

Announcements specified by 'bgn' start playing immediately, while announcements specified by an 'ip' or 'an' are played delayed by a time given by 'sdl'. 'sdl' will be specified in $10^{th}$ of a second from the beginning of the play of a background announcement. 'fdur' specifies, also in $10^{th}$ of a second, fade-in and fade-out durations when the background and foreground audio stream will overlap.

For example, an eCRBT command may look like:

S: pa(an=file://greeting.wav bgn=file://song.wav sdl=50 fdur=30)

In the above command, for the first 2 seconds, only a song will play at its normal volume. The song will gradually fade-away in the next 3 seconds and will keep on playing at a very low volume (background volume depending on the media server setting). After 5 seconds, a pre-selected greeting will start playing at its normal volume. Once the greeting has finished playing, the song will again start increasing in volume over the next 3 seconds and attain maximum volume.

b) VXML Design

Currently VXML supports playing of multiple audio/video content consecutively.

An example VXML script follows:

```
<prompt>
<audio src="first.wav" />
<audio src="second.wav" />
<audio src="third.wav" />
</prompt>
``` eCRBT scripts are written to support mixing of two audio streams, one playing in the background and the other playing in the foreground.

Following attributes for tag <audio> are added for eCRBT.

| | |
|---|---|
| mixtype | Valid values: foreground and background |
| fadeduration | Specified in $10^{th}$ of a second. |
| starttime | Time (in $10^{th}$ of a second) to start playing foreground prompts. Valid only when mixtype = "foreground". Time calculated from the beginning of the background announcement play. |

Example of an eCRBT script follows:

```
<prompt>
<audio src="greeting.wav" mixtype="foreground" fadeduration="30" starttime="50">
<audio src="song.wav" mixtype="background" fadeduration="30">
</prompt>
```

In the above command, for the first 2 seconds, only the song will play at its normal volume. The song will gradually fade-away in the next 3 seconds and will keep on playing at a very low volume (background volume depending on the media server setting). After 5 seconds, the greeting will start playing at its normal volume. Once the greeting has finished playing, the song will again start increasing in volume over the next 3 seconds and attain maximum volume.

Note that, if there are multiple foreground audio segments, then they will be played one after another. Background stream will not start fading in till all the foreground segments are played.

As mentioned earlier, one or more of the content streams or segments of a content stream may have promotional material, such as some advertisement content from the service provider itself or other business entities. Mixing subscriber-chosen content with advertisement content lowers service charge for individual subscribers, but opens up alternative revenue generation opportunity for the service providers.

Video Protocol Enhancement

The above examples relate to mixing two audio streams. Similarly the protocol can be extended to include other types of streams (e.g. video, text etc) and also can accommodate more than two streams.

For example, for eCRBT with two video streams, the parameters 'bgn' and 'ip' or 'an' can be used to specify the background and foreground video streams. A markup language, such as the Video Layout Markup Language (VLML) defined by IP Unity can be used to specify the layouts of the streams. Parameters are added to specify the layout to be used when only the background stream is playing (symbol: 'bgvl'), and the layout to be used when both background and foreground are playing (symbol: 'fgvl').

For example an eCRBT command for mixing two video streams may look like:

```
BAU/pa(an=file://greeting.mpeg bgn=file://musicvideo.mpeg
fgvl=<videolayout name="foreground and background layout"><root
size= "CIF" /><region id="1" left="0" top="0" relativesize="3/4"
source="an"/><region id="2" left="75%" top="75%"
relativesize="1/4"
source="file://musicvideo.mpeg"/></videolayout>
bgvl=<videolayout name="background only layout"><root size=
"CIF" /><region id="1" left="0" top="0" relativesize="100%"
source="bgn"/></videolayout>
fgst=50)
```

In the above command, first the music video will play in a window the size of the whole screen. After 5 seconds, the layout will change and the music video will continue playing as the background stream in a smaller window ¼ the size of the screen in the bottom right corner. At the same time, the foreground greeting will start playing in a window ¾ the size of the screen in the upper left corner. After the greeting has finished playing, the music video will again start playing on the entire screen.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

APPENDIX A

ACRONYMS AND DEFINITIONS
Below is a list of acronyms used or components
described in the specification and the figures.

| Acronym/Component | Full Form/Meaning |
| --- | --- |
| 3G | Third generation - mobile phone standard that provides the ability to transfer simultaneously both voice data and non-voice data. |
| AAU | Advanced AUdio package specification from PacketCable ™ |
| Audio/Video mixer | Mixes audio/video from multiple channels or sources and creates a single output stream to be sent out to the subscriber |
| BAU | Base AUdio package specification from PacketCable ™ |
| CIMD | Computer Interface for Message Distribution. It is a proprietary short message service cender protocol. |
| CMTS | Cable Modem Termination System. CMTS is a component that exchanges digital signals with cable modems on a cable network. |
| CRBT | Colorful Ring-Back Tone |
| DTMF | Dual tone Multi-Frequency |
| eCRBT | Enhanced Colorful Ring-Back Tone |
| ESME | External Short Message Entity. ESME is a device that may receive or send short messages (either using SMS or USSD). |
| GSM | Global System for Mobile communications |
| IAD | Integrated Access Device. A device that aggregates multiple channels of information including voice and data across a single shared access link to a carrier or service provider |
| IMS | IP Multimedia Subsystems - Voice-over-IP (VoIP) implementation based on a 3GPP standardized implementation of SIP |
| IS-41 | Interim Standard-41 for mobile communications |
| IVR | Interactive Voice Response. Voice/Video channels responsible for receiving/sending voice/video to subscriber phones. |
| MGCP | Media Gateway Control Protocol |
| MSC | Mobile Switching Center |
| NFS | Network File System. It is a standard for accessing files on a remote computer appearing as a local volume. |
| PRI | Primary Rate Interface |
| RTP | Real-time Transport Protocol |
| SIP | Session Initiation Protocol |
| SMPP | Short Message Peer-to-Peer messaging protocol for mobile communications |
| SMS | Short Message Service |
| SMSC | Short Message Service Center |
| SMS ESME | External Short Message Entity for SMS acts as receiver of CRBT requests from subscribers sent using SMS. |
| SQL | Structured Query Language. It is a language that provides an interface to relational database systems. |
| SS7 | Signaling System Number 7 |
| Tone Server | A Server responsible for playing CRBT to the caller. This can act either as a pure announcement server or can have the added responsibility of calling the called party and bridge the two call legs depending on the network. |
| UMTS | Universal Mobile Telecommunications System. Delivers 2 Mbps data to a mobile device. |

APPENDIX A-continued

ACRONYMS AND DEFINITIONS
Below is a list of acronyms used or components
described in the specification and the figures.

| Acronym/Component | Full Form/Meaning |
| --- | --- |
| USSD | Unstructured Supplementary Services Data. USSD provides session-based communication to transmit information over the signaling channels of the GSM network. |
| USSD ESME | External short message entity for USSD acts as receiver of CRBT requests from subscribers sent using USSD. |
| Voice Portal | Subscribers can call in using their phone to CRBT voice portal which will allow them to personalize their CRBT using speech or DTMF inputs. |
| VXML | Voice eXtensible Markup Language. An extension to XML that defines voice segments and enables access to the Internet via telephones and other voice-activated devices. |
| VXML Gateway | VoiceXML Gateway. Interprets VoiceXML (voice markup language similar to HTML in WWW) forms to provide voice portal for CRBT provisioning. |
| WAP | Wireless Application Protocol |
| WAP portal | Portal through which subscribers can personalize their CRBT using WAP browsers from their mobile device. |
| Web Portal | Portal through which subscribers can personalize their CRBT using web browsers from their desktop. |

What is claimed is:

1. A system for mixing two content streams in real time and rendering over a communications network the resulting mixed content stream to a calling party as an enhanced colorful ring-back tone (eCRBT), wherein a called party is a subscriber to the system and the system comprises:
    an eCRBT controller configured to:
        receive configuration information from a subscriber that identifies streaming content to be utilized for various callers;
        upon receiving a request for generating and providing an eCRBT to a calling party, select first and second content streams based on the identification of the calling party and the subscriber configuration information;
        mixing the first and second content streams and alter at least one property of the first and second content streams during the mixing; and
        render the created mixed content stream to a calling party, wherein the created mixed content stream is rendered in response to a call initiated by the calling party to the called party via the communications network.

2. The system of claim 1, wherein each of the selected first and second content streams is comprised of one or more streams selected from a group consisting of video streams, audio streams, text message streams, and hypermedia object streams.

3. The system of claim 1, wherein the altered at least one property of the first and second content streams is selected from a group of properties consisting of volume, pitch, brightness, and relative layout.

4. The system of claim 1, wherein each of the selected first and second content streams include data file streams selected from the group consisting of pre-stored data file streams and dynamic data file streams that are streamed from a server in real time.

5. The system of claim 1, wherein the creation of the mixed content stream comprises mixing the first and second selected content streams such that for a period of time the first content stream is rendered in a foreground with more prominence than the second selected content stream which is rendered in a background.

6. The system of claim 5, wherein, after said period of time, one or more properties of the second content stream is altered.

7. The system of claim 1, wherein the eCRBT controller is further configured to select and mix two or more content streams.

8. The system of claim 1, further comprising a media platform including a media server and an application server, wherein:
    the eCRBT controller is coupled to the media server and the application server; and the calling party and the called party are coupled to the media platform.

9. The system of claim 8, wherein the eCRBT controller creates the mixed content stream based on an algorithm executed by the application server.

10. The system of claim 8, wherein the content streams are selected based on inputs received from the subscribing party at a provisioning interface of the application server.

11. The system of claim 10, wherein the provisioning interface is one of a type selected from the group consisting of: web-based interface, WAP-based interface, desktop-based interface, SMS-based interface, USSD-based interface, and voice-based interface.

12. The system of claim 1, wherein at least one of the content streams contains content uniquely associated with the called party.

13. The system of claim 1 further comprising a database, wherein at least one of the content streams contains content associated with the calling party, the content being stored in the database.

14. The system of claim 1, wherein at least one of the content streams contains promotional content.

15. The system of claim 14, wherein the promotional content is related to the called party.

16. The system of claim 14, wherein the promotional content is directed to the calling party.

17. The system of claim 1, wherein at least one of the content streams contains real-time information related to the called party's current availability.

18. The system of claim 1, wherein the at least one property of the first and second content streams is altered gradually.

19. A method for mixing two or more content streams in real time, wherein the mixed content stream may be rendered as an eCRBT in response to a call initiated by a calling party to a called party, the method comprising the steps of:
a) selecting two or more content streams;
b) receiving a command for creation of a mixed content stream that contains the two or more selected content streams mixed in real time;
c) starting to render, to the calling party, a first content stream from the two or more selected content streams;
d) starting to render, to the calling party, a second content stream from the two or more selected content streams, wherein the rendering is started subsequent to the rendering start for the first content stream; and
e) altering at least one property of each of the first and second content streams, wherein the altering of the properties causes the prominence of the first content stream relative to the second content stream to be changed as the mixed content stream is rendered.

20. The method of claim 19, wherein steps c)-e) are repeated with successive content streams until the process is terminated via the called party responding to, or disposing of, the call.

21. A method for mixing two or more content streams in real time, wherein the mixed content stream may be rendered as an eCRBT in response to a call initiated by a calling party to a called party, the method comprising the steps of:
a) selecting two or more content streams;
b) receiving a command for creation of a mixed content stream that contains the two or more selected content streams mixed in real time;
c) rendering, to the calling party, the selected content streams simultaneously such that one content stream is rendered with more prominence relative to the other content streams; and
d) altering one or more properties of the content streams during simultaneous rendering such that the prominence of each content stream relative to the other content streams is adjusted.

22. The method of claim 21, wherein steps c)-d) are repeated with successive content streams until the process is terminated via the called party accepting the call.

* * * * *